（12）United States Patent
Cox et al.

(10) Patent No.: US 12,341,330 B2
(45) Date of Patent: Jun. 24, 2025

(54) HIGH VOLTAGE CABLE STAY GROMMET

(71) Applicant: Dana Automotive Systems Group, LLC, Maumee, OH (US)

(72) Inventors: Samuel Wesley Cox, Paris, TN (US); Ernest Oxenknecht, Naperville, IL (US); Jason Wimberley, Paris, TN (US); Dakota Foster, Paris, TN (US); Thomas M. O'Neil, Holland, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 405 days.

(21) Appl. No.: 17/821,114

(22) Filed: Aug. 19, 2022

(65) Prior Publication Data

US 2024/0063622 A1    Feb. 22, 2024

(51) Int. Cl.
*H02G 3/32* (2006.01)
*B60R 16/02* (2006.01)

(52) U.S. Cl.
CPC ........... *H02G 3/32* (2013.01); *B60R 16/0222* (2013.01)

(58) Field of Classification Search
CPC .......... H02G 3/32; B60L 50/66; B60L 50/51; B60R 16/0215; B60R 16/0222
USPC .......................................................... 174/652
See application file for complete search history.

(56) References Cited

U.S. PATENT DOCUMENTS

| | | | | |
|---|---|---|---|---|
| 2,354,919 | A * | 8/1944 | Lockwood | F16L 3/2235 248/68.1 |
| 6,528,728 | B1 * | 3/2003 | Shima | H02G 3/0437 174/101 |
| 7,156,671 | B2 | 1/2007 | Kauth | |
| 7,476,121 | B2 | 1/2009 | Tsuji | |
| 7,806,374 | B1 * | 10/2010 | Ehmann | H02G 3/22 174/64 |
| 7,837,495 | B2 | 11/2010 | Baldwin et al. | |
| 8,246,376 | B2 | 8/2012 | Amit et al. | |
| 8,766,109 | B2 | 7/2014 | Duval et al. | |
| 9,379,488 | B2 | 6/2016 | Schneider | |
| 9,948,027 | B2 | 4/2018 | Sandwith | |
| 9,975,287 | B2 | 5/2018 | Paynter et al. | |
| 11,437,799 | B2 * | 9/2022 | Ehmann | H02G 3/088 |
| 2005/0011687 | A1 * | 1/2005 | Yamaguchi | B60K 6/48 180/65.21 |
| 2011/0114801 | A1 * | 5/2011 | Ehmann | H02G 3/083 248/68.1 |
| 2012/0048616 | A1 * | 3/2012 | Breen, IV | H02G 3/22 174/651 |
| 2014/0154914 | A1 | 6/2014 | Schneider | |
| 2015/0144414 | A1 * | 5/2015 | Tanigaki | B60L 1/02 180/291 |
| 2018/0006396 | A1 | 1/2018 | Sandwith | |
| 2020/0031294 | A1 * | 1/2020 | Oba | B62J 11/10 |
| 2020/0169072 | A1 * | 5/2020 | Ehmann | H02G 15/007 |

(Continued)

*Primary Examiner* — Timothy J Thompson
*Assistant Examiner* — Michael F McAllister
(74) *Attorney, Agent, or Firm* — McCoy Russell LLP (57) ABSTRACT

A cable support assembly comprising a grommet, a clamp, and a single or a plurality of fasteners. Wherein, the grommet is an elastic grommet comprising clamp section and strain-relief section, and the clamp is a rigid clamp comprising an upper clamp half and a lower clamp half. Wherein, the at least one fastener may tighten the clamp halves together and affix the cable support assembly to a surface.

19 Claims, 5 Drawing Sheets

(56) References Cited

U.S. PATENT DOCUMENTS

2021/0313096 A1\* 10/2021 Ehmann ............... H02G 15/013
2021/0328416 A1\* 10/2021 Ehmann ................... F16L 5/10

\* cited by examiner

FIG. 3

HIGH VOLTAGE CABLE STAY GROMMET

TECHNICAL FIELD

The invention relates to a high voltage cable stay grommet.

BACKGROUND AND SUMMARY

Fully electric vehicles and hybrid electric vehicles may utilize a battery as a power source and one or more electric machines as a prime mover. The battery of a vehicle may be housed on the chassis of a vehicle while the inverters and transmission that deliver electrical power to an electric machine may be located on the axle. Power may be transferred in the form of electricity through a cable from battery to the inverters and transmission.

While cables are a reliable and efficient path to transfer electricity, the dynamic motion of the vehicle may inhibit and degrade the cable. For one example, dynamic motion of a vehicle, such as turning, may cause a cable to develop kinks, crimp, etc. causing degradation to the cable. As another example, the dynamic motion of a vehicle may cause a cable firmly fastened against features of the vehicle, such as the chassis or body, and/or to a clamp to prevent kinking or crimping, to experience strain, causing fatigue and degradation to the cable.

The inventor has recognized the above challenges and has developed in one example a clamp and grommet to secure and support an electrical cable. The clamp may be formed of a rigid material and comprised of two pieces. In an example, the clamp may be a two-piece clamp. The grommet may be formed of a softer elastomer or elastomeric material and be comprised of a clamp section and a strain-relief section.

In an example, by providing a clamp around the grommet, the cable may be mounted to a surface, e.g., a mounting surface, of the vehicle while still supporting the cable. The pieces of the clamp allow the tightness of the clamp to be adjusted. By providing a strain-relief section for the grommet, the strain-relief section may support the cable while reducing kinking, crimping, or similar deformation, and while allowing the cable to flex during dynamic motion. In an example, mounting and cable strain-relief may be incorporated into a single unit.

It should be understood that the summary above is provided to introduce, in simplified form, a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to design of a clamp and grommet that may form a cable support assembly for an electrical cable. In an example, a grommet is strengthened through various cooperating structural elements and relative position between the grommet and clamp. Likewise, the clamp is strengthened through various cooperating structural elements and relative position between the grommet and clamp.

The clamp is a two-piece clamp that may be formed by an upper and a lower piece that may be referred to as sections. When formed the two-piece clamp may form a bore with a plurality of orifices. When formed the two-piece clamp may include a plurality of support structures. In one example, the support structures may include bore rings, arches, ribs, and beams. Each of the plurality of support structures may be cast with and/or machined from the components of the two-piece clamp. The two-piece clamp may be cast or formed of a rigid metal, a rigid composite, or another rigid material. Therein the clamp, or two-piece clamp, may be a rigid clamp.

The grommet may form a clamp section and a strain-relief section. The clamp section may be surrounded by the two-piece clamp. The strain-relief section is continuous with and extend from the clamp section. The grommet may form a continuous bore with a plurality of orifices. Additionally, the grommet may surround a cable. The grommet may be formed of an elastomer or an elastomeric material such as flexible plastic, a rubber, or another flexible material.

Figure 1:
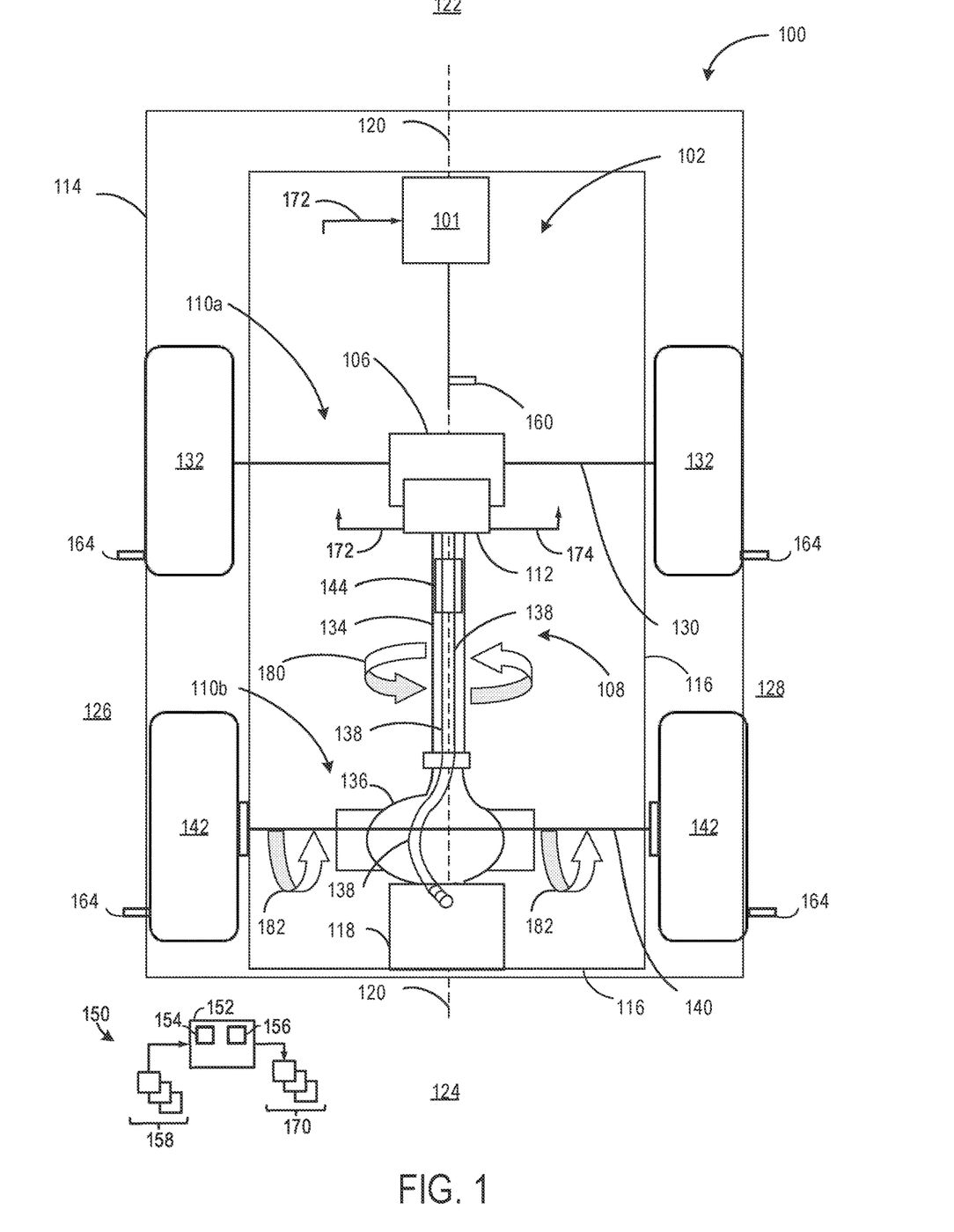
FIG. 1 schematically depicts a commercial vehicle driveline including an axle assembly according to an embodiment of the presently disclosed subject matter.

The clamp and grommet are shown integrated into a schematic of a vehicle in FIG. 1. Wherein, the clamp and grommet are positioned above or below the driveline between a battery and inverter to support an electrified cable.

Figure 2A:
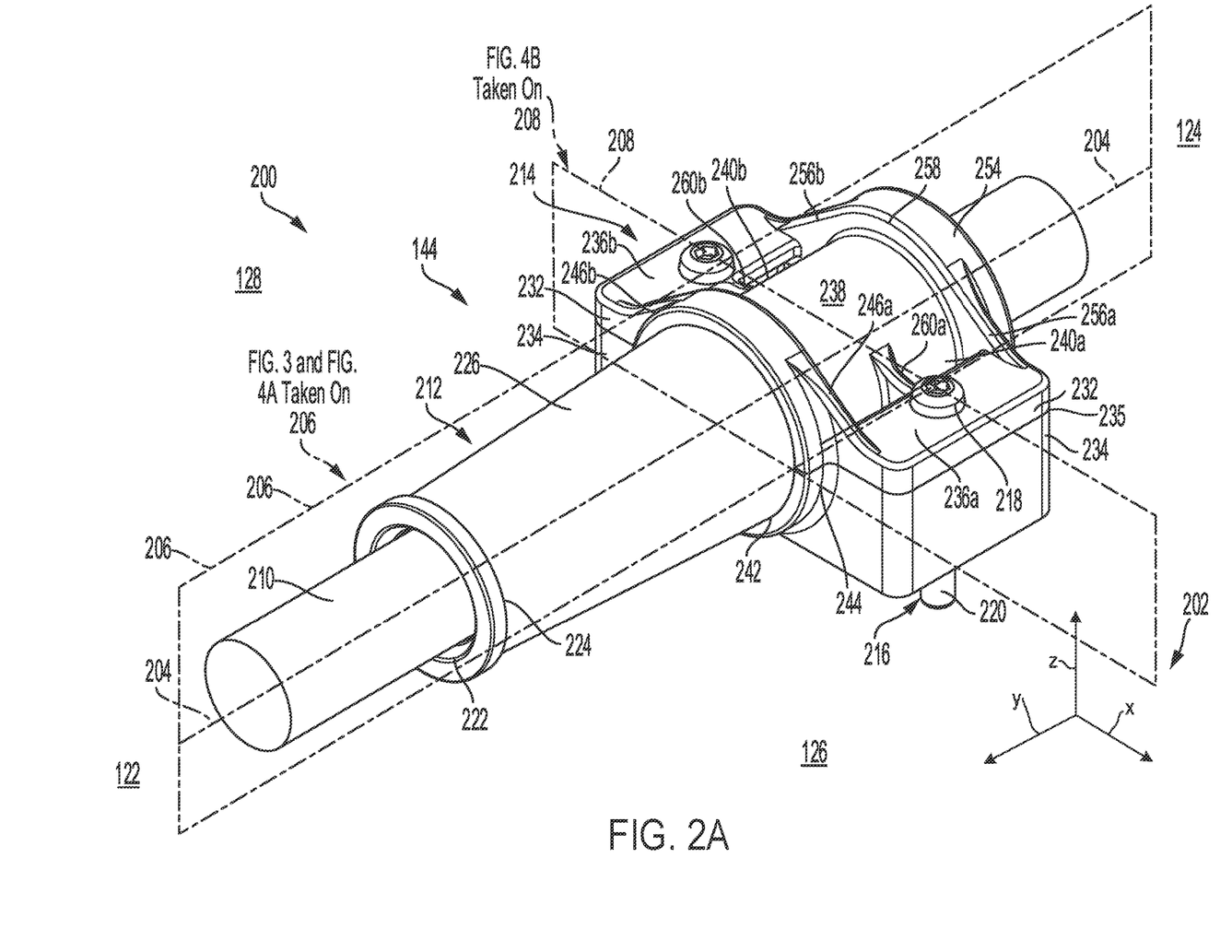
FIG. 2A is an isometric illustration of an assembled clamp and grommet from above.
Figure 2B:
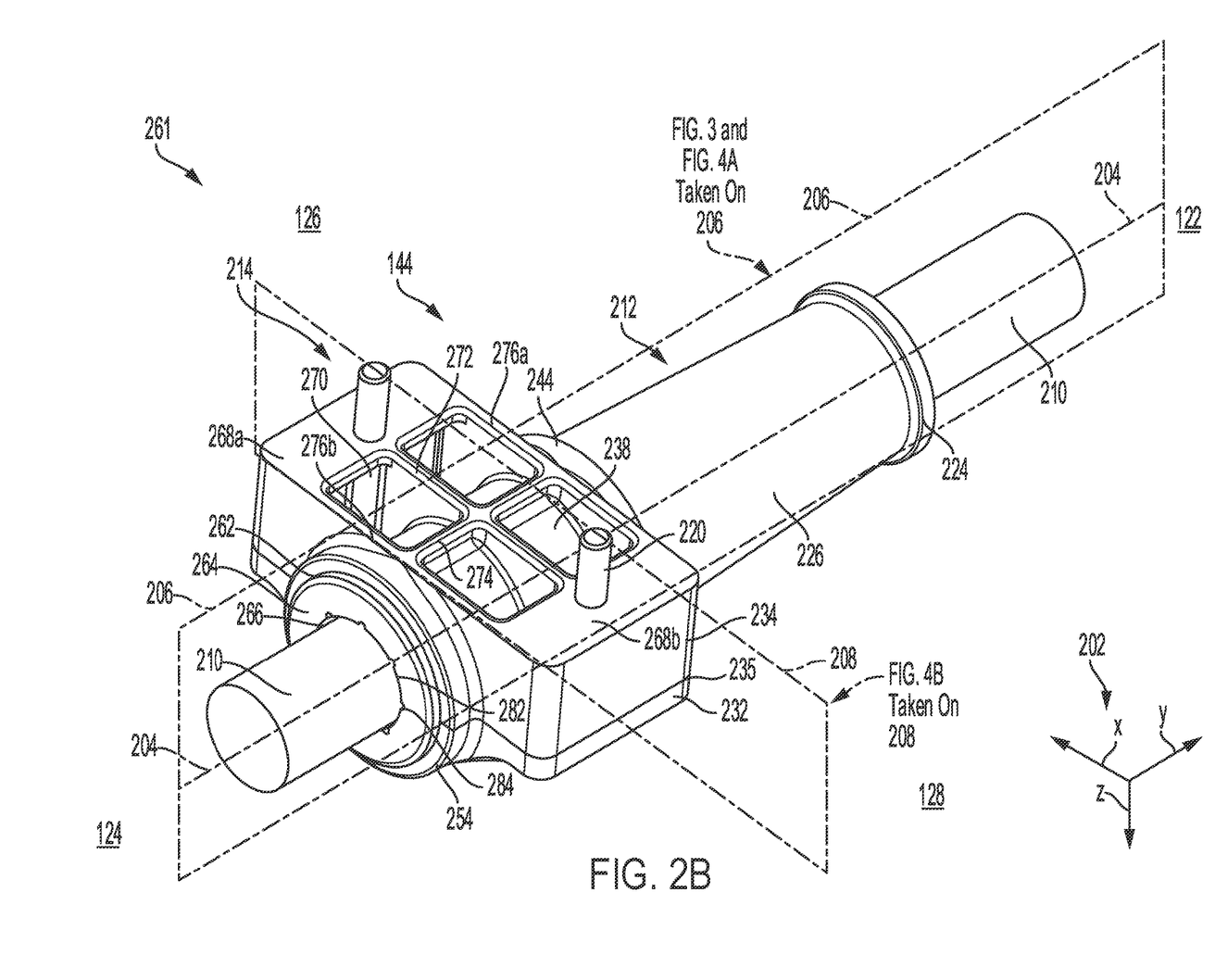
FIG. 2B is an isometric illustration of an assembled clamp and grommet from below.

An isometric view of a drawing of assembled clamp and grommet are shown in greater detail in FIG. 2A and FIG. 2B. Wherein, FIG. 2A is shown from above and FIG. 2B is shown from below with respect to a z-axis.

Figure 3:
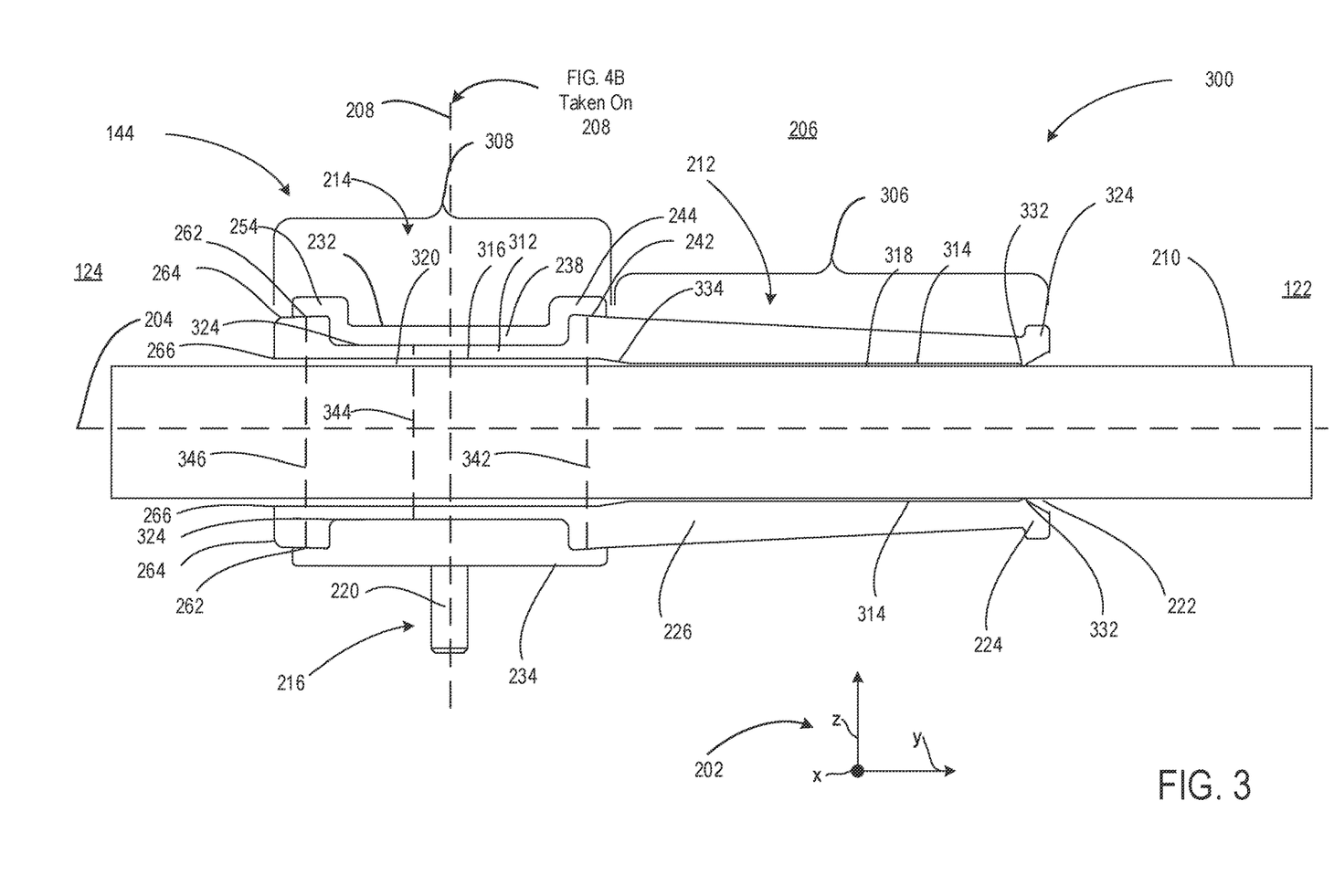
FIG. 3 is a cutaway view of an assembled clamp and grommet on a longitudinal cross section plane.

The clamp and grommet, are shown in a cross-sectional view in FIG. 3. Additionally, the clamp is shown in various cross-sectional views in FIG. 4A-4B. For example, a first cross-sectional view is shown taken along a longitudinal plane for the clamp and grommet in FIG. 3 and for the clamp taken in FIG. 4A. A second cross-sectional view of the clamp is taken along a transverse plane in FIG. 4B that may be substantially perpendicular to the longitudinal plane in FIG. 3 and FIG. 4A.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced. FIGS. 2A-4B are shown approximately to scale. FIGS. 2A-4B may be used to represent other relative dimensions. As used herein, the terms "approximately" and "substantially" are construed to mean plus or minus five percent of the range unless otherwise specified.

Further, FIGS. 2A-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

FIG. 1 shows a schematic diagram of a vehicle 100. The vehicle 100 may comprise an electric machine 101 as a prime mover used to convert electricity into mechanical energy to drive the vehicle. For some examples, such as in FIG. 1, the vehicle 100 may be a fully electric vehicle using only an electric machine 101 as a prime mover. Additionally, for other examples, the vehicle 100 may be a hybrid vehicle using an electric machine 101 and an engine which may increase fuel efficiency. However, it is to be appreciated that configuration of the vehicle is non-limiting, and alternative configurations have been contemplated and considered. In alternative examples there may be one or more electric machines. In alternative examples there may be one or more electric machines located other regions of the vehicle 100. In alternative examples, the vehicle 100 may include solely an engine, such as an internal combustion engine, to act as a prime mover. For these examples, the cable may be used to supply additional energy to a powertrain 102 or deliver energy from the prime mover to be stored in a battery. The vehicle 100 may be a light, medium, or heavy duty type vehicle that may be designed for on-road and/or off-road travel.

FIG. 1 shows the vehicle 100 having an electrical drive system in the form of a powertrain 102. The powertrain 102 includes an electric machine 101, a transmission 106, an inverter 112, and a battery 118, and a drivetrain 108. The vehicle 100 may comprise an electric machine 101 (e.g., an electric motor or electric motor/generator, and the like). The electric machine 101 may generate power in the form of electricity and/or mechanical energy through a torque. Therein the electric machine 101 may supply electricity to the powertrain 102. A power supply, such as a battery 118, may supply the electric machine 101 and/or supply the powertrain 102 with power in the form of electricity.

As seen in FIG. 1 the vehicle 100 may comprise a drivetrain 108. The drivetrain 108 includes driveshaft 134, a first drive axle 110a, a second drive axle 110b, and a transmission 106. The driveshaft 134 of the drivetrain 108 is aligned (e.g., substantially parallel, such as within 5% of parallel) with the longitudinal axis 120 (e.g., the longitudinal axis 120 is parallel with the length and concentric to the center of the driveshaft 134).

The vehicle 100 may also comprise a chassis 116 and a body 114. The chassis may be located below the body 114 and the first and second drive axles 110a, 110b. The chassis 116 of the vehicle 100 may support components of the powertrain 102 and drivetrain 108, such as the first drive axle 110a, the second drive axle 110b, and the battery 118. The body 114 of the vehicle 100 may surround the occupants, cabin, the powertrain 102, and the drivetrain 108.

There are four regions used to reference position around the vehicle 100 described herein. The vehicle 100 may have a front side 122, a rear side 124, a first side 126, and a second side 128.

In one example, the first drive axle 110a of the vehicle 100 is located nominally toward the front side 122. The first drive axle 110a may include a first shaft 130 that mechanically couples a first pair of front wheels 132 through the first drive axle 110a and a front axle carrier. The first shaft 130 may be configured to drive a first pair of front wheels 132 of the vehicle 100. The first shaft 130 and the first drive axle 110a may be coupled to the transmission 106 of the vehicle 100.

In one example the second drive axle 110b is located near the rear side 124. The second drive axle 110b may include a second shaft 140 that mechanically couples a second pair of rear wheels 142 through the rear axle carrier 136. The second shaft 140 may be configured to drive a second set of rear wheels 142 of the vehicle 100. The second shaft 140 may be configured to a rear axle carrier 136. The rear axle carrier 136 may be located nominally in the center of and mechanically couple the first side 126 and second side 128 of the second shaft 140.

In one example, as shown by FIG. 1, the transmission 106 as well as the first drive axle 110a are mechanically coupled to the driveshaft 134. The driveshaft 134 connects and mechanically couples the transmission 106 and first drive axle 110a to the second drive axle 110b. The driveshaft 134 is mechanically coupled to the second drive axle 110b and second shaft 140 via the rear axle carrier 136.

There may be relative motion during vehicle operation, such as a turn, between the axle, e.g., the first drive axle 110a and second drive axle 110b, and the chassis 116. In one example, the first drive axle 110a, including a first shaft 130 and a front axle carrier, may be arranged nearer to the front side 122 of the vehicle 100 compared to the second drive axle 110b. For this example, the second drive axle 110b, including the second shaft 140 and rear axle carrier 136, is arranged to be nearer to a rear side 124 of the vehicle 100 than the first drive axle 110a.

The electric machine 101 may be supplied with power in the form of electricity from and electrically coupled to the battery 118 via an electrical cable 138 and the inverter 112. The electrical cable 138 may electrically couple the battery 118 to the inverter 112. The inverter 112 may be electrically coupled to the transmission 106, and the transmission 106 may be electrically coupled to the electric machine 101. The transmission 106 may also be mechanically coupled to the electric machine 101. As shown in FIG. 1, the inverter 112 may be located substantially on, above, and/or within the transmission.

For the present disclosure, as shown in FIG. 1, the electrical cable 138 may be substantially located below the drivetrain 108 and supported by the chassis 116 of the vehicle 100. The electrical cable 138 may extend from the chassis 116 to the first drive axle 110a and into the inverter 112. As shown in FIG. 1, for one example, the electrical cable 138 is mounted or fastened to the chassis 116 via a cable support assembly 144. However, it should be appreciated that the position of the cable support assembly 144 and electrical cable 138 are non-limiting and may be fastened and/or affixed to other surfaces. For one example the cable support assembly 144 may be mounted to and affix the electrical cable 138 to the first drive axle 110a of the vehicle 100. For one example the cable support assembly 144 may be fastened to and affix the electrical cable 138 to the body 114 of the vehicle 100 and substantially above the drivetrain 108.

However, other surfaces and components of the vehicle 100 are possible and have been considered.

The cable support assembly 144 may be fastened and affix the electrical cable 138 to the chassis 116 and inverter 112. The cable support assembly 144 may allow the electrical cable 138 to be subject to dynamic motion, such as the turning of the first drive axle 110a. Therein, the cable support assembly 144 may allow the electrical cable 138 to flex. The cable support assembly 144 may also prevent the electrical cable 138 from twisting and/or crimping due to the dynamic motion of the vehicle 100.

The electrical cable 138 may pass through the cable support assembly 144 to electrically couple to the inverter 112. The inverter 112 may convert direct current (DC) from the battery 118 and electrical cable 138 into alternating current (AC) for the electric machine 101.

A control system 150 with a controller 152 may be incorporated in the vehicle 100. The controller 152 includes a processor 154 and memory 156. The memory 156 may hold instructions stored therein that when executed by the processor 154 cause the controller 152 to perform the various methods, control strategies, diagnostic techniques, etc., described herein. The processor 154 may include a microprocessor unit and/or other types of circuits. The memory 156 may include known data storage mediums such as random access memory, read only memory, keep alive memory, combinations thereof, etc. The memory 156 may include non-transitory memory.

The controller 152 may receive vehicle data and various signals from sensors positioned in different locations in the vehicle 100, indicated at 158. The sensors may include a shaft speed sensor 160 and wheel speed sensor 164, etc. The controller 152 may send control signals to controllable components, indicated at 170. Additionally or alternatively, a vehicle electronic control unit (ECU) may be provided in the vehicle 100 to control other adjustable components such as the electric machine 101 (e.g., the prime mover). The control system 150 and specifically the controller 152 with the memory 156 and processor 154 may therefore be configured to carry out the control techniques. A controller 152 may monitor inputs from the shaft speed and wheel speed sensors 160, 164 to determine various operating parameters of the vehicle 100, such as vehicle speed, engine revolutions per minute (RPM), speed of the ring gear, throttle position as indicated by the position of an accelerator pedal, and other parameters as set forth below.

The controller 152 and control system 158 may take energy demand requests from the electric machine 101 and other components of the powertrain 102 that use AC current. Therein, the controller 152 and control system 158 may send commands to the inverter 112 to adjust DC current to AC current. For one example, the inverter 112 may adjust the DC current to frequency of AC current and power based on the command from the controller 152 for the electric machine 101. Electricity with an AC current may be delivered from the inverter to the electric machine 101 through path 172.

For another example the controller 152 and control system 158 may receive energy requests other electrically powered components of the powertrain 102 requiring AC. Therein, the controller 152 and control system 158 may send commands to the inverter 112. For this example, the inverter 112 may adjust DC current to a frequency of AC current and power based on the command from the controller 152 for other components of the powertrain 102. Electricity with an AC current may be delivered from the inverter to other components of the powertrain 102 through path 174.

FIG. 1 shows a rotational path of the driveshaft 134 and the second shaft 140. For this example, a driveshaft 134 has a forward rotational path 180 that encircles and rotates around center line concentric to the driveshaft 134. When the vehicle 100 drive forward, a torque created by a prime mover, such as electric machine 101, forces the driveshaft 134 to turn toward the first side 126 on the forward rotational path 180. For this example, the forward rotational path 180 of the driveshaft 134 may be counter clockwise when viewed looking down the driveshaft 134 and longitudinal axis 120 from the rear side 124. However, it should be appreciated that the forward rotational path 180 of the driveshaft 134 may be non-limiting, and the rotation of the forward rotational path 180 of the driveshaft may be dependent on the components and the positioning of components within the rear axle carrier 136. For an alternative example, the rotational path of the driveshaft 134 rotating in opposite direction of forward rotational path 180 and may drive the vehicle forward using a differential of a different configuration.

The rotation of the driveshaft 134 transfers mechanical energy generated by the electric machine 101 to the differential gear assembly of the rear axle carrier 136. The gear assembly transfers mechanical energy into and causes the second shaft 140 to rotate. A second shaft forward rotational path 182 encircles and rotates around a center line concentric to either side of the second shaft 140. The second shaft forward rotational path 182 turns the second shaft 140 and pushes the vehicle 100 toward the front side 122. The second shaft forward rotational path 182 may be clockwise when viewed down the second shaft 140 from the second side 128. For the example shown in FIG. 1, when the transmission 106 and electric machine 101 move the vehicle 100 in reverse, (e.g., in the direction of the rear side 124), the rotational path of the driveshaft 134 and the second shaft 140 may be reversed.

For FIG. 2A-4B the cable support assembly 144 may be assumed to be within vehicle 100. Therein, positions of the vehicle, such as the front side 122, the rear side 124, the first side 126, and the second side 128 may be referenced. Additionally, components, such as the transmission 106, inverter 112, and first drive axle 110a, and their positions within the vehicle 100 may be referenced in FIG. 2A-4B.

A set of reference axes 202 are provided in FIG. 2A-4B. The reference axes 202 indicate a y-axis, an x-axis, and a z-axis. In one example, the z-axis may be parallel with a direction of gravity and the x-y plane may be parallel with a horizontal plane the vehicle 100 may rest upon. In another example, the z-axis may be parallel with a direction of gravity and the x-y plane may be parallel with a horizontal plane the cable support assembly 144 may rest upon. When referencing direction, positive may refer to in the direction of the arrow of the y-axis, x-axis, and z-axis and negative may refer to in the opposite direction of the arrow of the y-axis, x-axis, and t-axis.

Figure 4A:
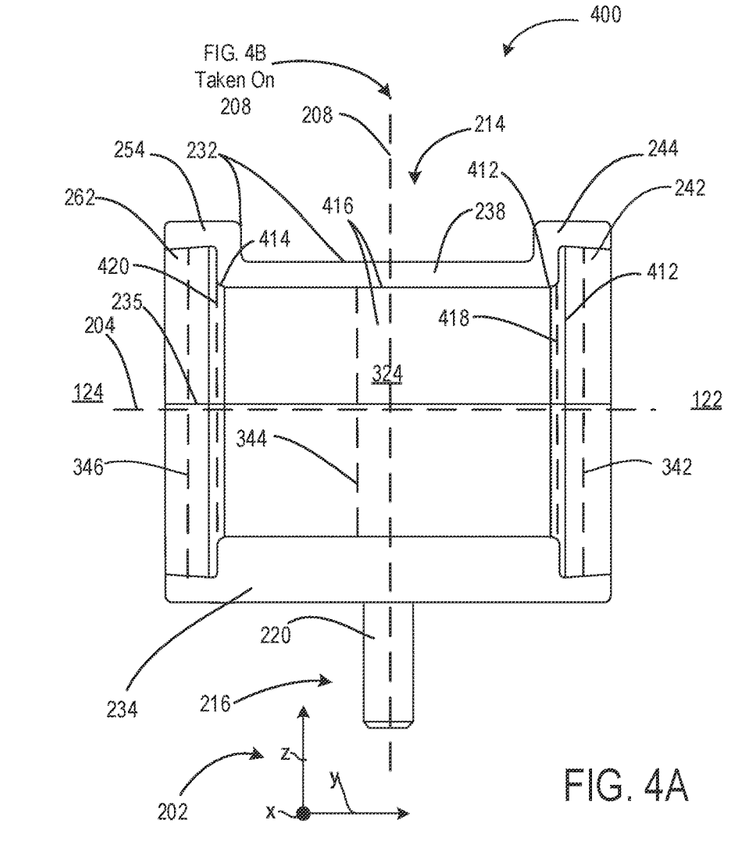
FIG. 4A is a cutaway view of a clamp on a longitudinal cross-section plane.
Figure 4B:
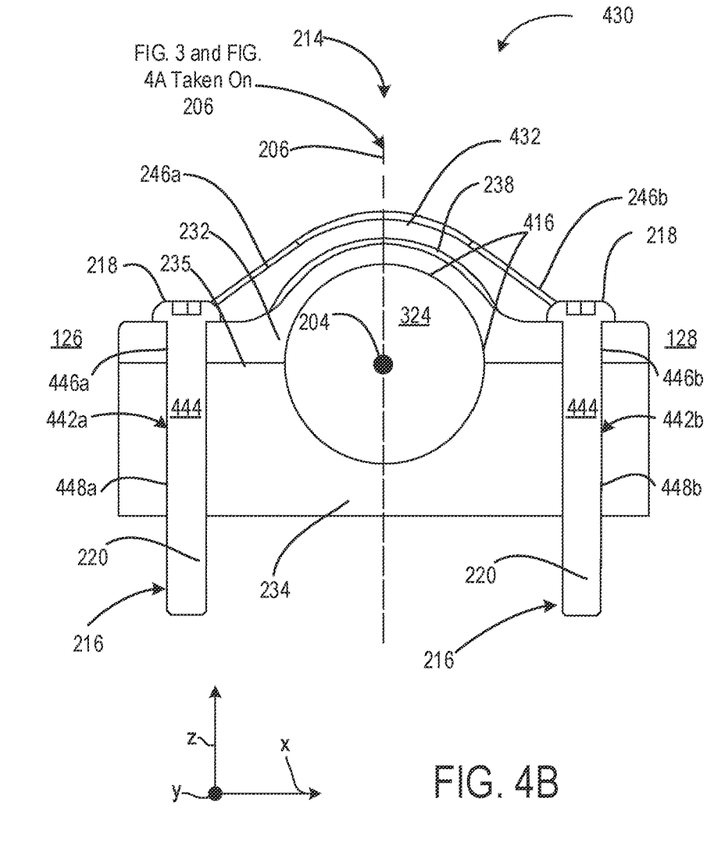
FIG. 4B is a cutaway view of a clamp on a transversal cross-section plane.

The y-axis may be parallel with a central axis, (e.g., 204 in FIG. 2A-4B) and longitudinal cross-section plane (e.g., 206 in FIG. 2A-2B, and FIG. 4B). A longitudinal cross-section plane (e.g., 206 in FIG. 2A-2B, and FIG. 4B) may be coplanar and/or parallel with a plane formed by the y-axis and z-axis. Therein, the x-axis or a line parallel with the x-axis may be normal to cutouts/cross-sections in FIG. 3 and FIG. 4A (e.g., 300 in FIGS. 3 and 400 in FIG. 4A).

In one example, the x-axis may be parallel with a transverse cross-sectional plane (e.g., 208 in FIG. 2A-4A). The transverse cross-section plane (e.g., 208 in FIG. 2A-4A) may be coplanar and/or parallel with a plane formed by the x-axis and z-axis. Therein, the x-axis or a line parallel with the x-axis may be normal to cutouts/cross-sections FIG. 4B (e.g., 430 in FIG. 4A).

Turning to FIG. 2A, as shown in FIG. 2A, the cable support assembly 144 from FIG. 1 may be shown from a first isometric perspective 200. The first isometric perspective 200 is shown nominally from above the cable support assembly 144 with respect to the y-axis.

The cable support assembly 144 may be aligned along (e.g., collinear with a centerline through) and circumferentially surround a central axis 204. For this example, the central axis 204 may be parallel with the y-axis of the reference axes 202 and collinear with the longitudinal axis 120 of FIG. 1.

The cable support assembly 144 may be divided into two symmetrical halves along the central axis 204 by a longitudinal cross-section plane 206. The cable support assembly 144 and clamp 214 may be divided by a transversal cross-section plane 208 co-planer with an x-z plane.

An electrical cable 210 may be aligned along (e.g., collinear with a centerline through) and have a length parallel to the central axis 204. The electrical cable 210 may be a high voltage cable, e.g., may have a voltage greater than 1000 volts with AC and 1500 with DC, capable of transferring power from a battery to an inverter, such as inverter 112, to power an electric machine and drive a vehicle, such as vehicle 100. The high voltage cable, e.g., the electrical cable 210, may therein electrically couple the battery to the electric drive system, (e.g., the powertrain 102 in FIG. 1). The electrical cable 210 may also be a flexible cable capable of dynamic motion and bending to accommodate relative motion among vehicle components between which the cable is routed. While shown being linear, the cable may have one or more bends. The electrical cable 210 may be the electrical cable 138 shown in FIG. 1.

As shown in FIG. 2A, the grommet 212 acts a jacket that may circumferentially surrounds a portion of the cable. The grommet 212 may be formed of flexible and elastic material, such as rubber or another elastomeric material. Therein, the grommet 212 is an elastic grommet. A portion of the grommet 212 and therein the cable 210 may be circumferentially surrounded by a two-piece clamp in the form of a clamp 214. The clamp 214 may be formed from a rigid material, such as thermoplastic or thermoset composites, carbon fiber composites, aluminum, steel, or various other materials, and therein may be referred to herein as a rigid clamp 214. Therein, the elastomeric material forming the grommet 212 may act as an electrical insulator preventing electrical discharge between the cable 210 and the rigid clamp 214. The rigid clamp 214 may be assembled and secured over the grommet 212 via fasteners 216. For the example shown in FIG. 2A, fasteners 216 have a head 218 that may abut the surfaces of the rigid clamp 214 from above along the z-axis, and fasteners 216 have a shank 220 that extending through the material of the rigid clamp 214 along the z-axis.

As shown in FIG. 2A, the grommet 212 may have a neck 226 that extends toward and forms into a first bore ring 224. The neck 226 extends axially with a gradually reduced outer diameter along the central axis 204 and away from the clamp 214. The neck 226 may extend along and toward the free end of the electrical cable 210, e.g., towards the end of the cable 210 that is mounted to a different component than the cable support assembly 144. The first bore ring 224 of the grommet 212 may circumferentially surround a first bore orifice 222 and the cable 210. The neck 226, first bore ring 224, and first bore orifice 222 may not be surrounded by the clamp and have outer surfaces exposed to atmosphere. The cable 210 may extend out from the first bore orifice 222 along the central axis 204.

As shown in FIG. 2A, for one example, the cable support assembly 144 may be mounted to the chassis of a vehicle, such as chassis 116 of vehicle 100. For this example, the first bore orifice 222 and first bore ring 224 may be closest to the front side 122 of the vehicle 100. Therein, for this example the neck 226 of the grommet 212 may extend toward the front side 122 and the inverter 112 of vehicle 100 away from the chassis 116.

For another example, the cable support assembly 144 may be mounted to the first axle of a vehicle, such as first drive axle 110a of vehicle 100. For this example, the first bore orifice 222 and first bore ring 224 may be closest to the rear side 124 of the vehicle 100. Therein, for this example the for this example neck 226 of the grommet 212 may extend toward the rear side 124 of vehicle 100 away from the first drive axle 110a and inverter 112.

The rigid clamp 214 may be formed of two pieces or sections: an upper section 232 and a lower section 234. Therein, the rigid clamp 214 is and may also be referred to herein as a two-piece clamp. For one example, the upper section 232 may be an upper clamp half and the lower section 234 may be a lower clamp half. The upper section 232 surrounds the grommet 212 and cable 210 from the top with respect to the z-axis. The lower section 234 surrounds the grommet 212 and cable 210 from the bottom with respect to the z-axis. As shown in FIG. 2A, the upper section 232 and lower section 234 of the rigid clamp 214 may have a surface-sharing or face-sharing contact and form the rigid clamp 214 on coupling region 235. The rigid clamp 214 may be divided into the upper section 232 and lower section 234 by the coupling region 235 along a plane parallel with a plane formed by the x-y axes. The coupling region 235 may extend continuously around the perimeter of the rigid clamp 214 with respect to the x-y axes. For the example shown in FIG. 2A, the upper section 232 and lower section 234 of the clamp may be fastened together to form the rigid clamp 214 over the grommet 212 via fasteners 216.

As shown in FIG. 2A, the heads 218 of fasteners 216 may abut the top facing surface of a first side platform 236a and/or a second side platform 236b. The fastener shank 220 may extend through the first side platform 236a and/or second side platform 236b through the upper section 232 and lower section 234 of the rigid clamp 214. The clamp 214 may be divided into two symmetrical halves along the center of the fasteners 216 by the transversal cross-section plane 208.

For one example the fastener shank 220 may have a threaded surface. The fastener shank 220 may also extend through complementary bores (e.g., first and second fastener bores 442a, 442b in FIG. 4B) in a first side platform 236a and second side platform 236b. Through the first and second side platforms 236a, 236b, the shanks 220 of the fasteners 216 may extend along the z-axis through and below the upper and lower sections 232, 234 of the rigid clamp 214. For one example of the present disclosure, at least one fastener 216 may be used to fasten the upper and lower sections 232, 234 to form the rigid clamp 214 around the grommet 212 and cable support assembly 144 to a mounting surface.

However, it should be appreciated that the design and usage of the fasteners 216 may be non-limiting. It should be appreciated in other variations of the rigid clamp 214, the fasteners 216 could be replaced with a snap fit connection, rivets, or another fastening method.

The rigid clamp 214 may form a first side platform 236a, located near the first side 126, and a second side platform 236b, located near the second side 128. The rigid clamp 214 may form a clamp sleeve 238 between the first and second side platforms 236a, 236b with respect to the x-axis. The clamp sleeve 238 may circumferentially encircle a portion of the cable 210 and grommet 212. Between the clamp sleeve 238 and the first side platform 236a is a first side cutout 240a with respect to the x-axis. Between the clamp sleeve 238 and the second side platform 236b is a second side cutout 240b with respect to the x-axis. The first and second side cutouts 240a, 240b may reduce the volume and weight of material used for the rigid clamp 214.

The clamp 214 may comprise first bore orifice 242 circumferentially encircled and supported by a first bore ring 244. The first bore orifice 242 and first bore ring 244 may be face the front side 122 of the rigid clamp 214. The first bore orifice 242 and the first bore ring 224 may partially and circumferentially encircle a portion of the grommet 212 and cable 210. The neck 226 may extend from a first bore orifice 242 and first bore ring 244 of the rigid clamp 214, if the rigid clamp 214 is formed and fastened over the grommet 212. The portion of the first bore ring 224 formed by the upper section 232 of the rigid clamp 214 may be supported by a first side first bore rib 246a and a second side first bore rib 246b. The first and second side first bore ribs 246a, 246b may form a first bore arch (e.g. first bore arch 432 in FIG. 4B) with the first bore ring 224. The first bore arch (e.g., 432 in FIG. 4B) may provide structural support for the first bore ring 224.

As seen in FIG. 2A, the clamp 214 may also comprise second bore ring 254 located near the rear side 124. The second bore ring 254 may circumferentially encircle and support a second bore orifice (e.g., second bore orifice 262 in FIG. 2B). The portion of the second bore ring 254 formed by the upper section 232 of the rigid clamp 214 may be supported by a first side second bore rib 256a and a second side second bore rib 256b. The first and second side second bore ribs 256a, 256b may form a second bore arch 258 with the second bore ring 254. The second bore arch 258 may act as a structural member and support for the second bore ring 254. Therein, the second bore arch 258 may prevent degradation to the rigid clamp 214 by distributing and redirecting forces, such as those created by dynamic motion, placed on the second bore ring 254.

As seen in FIG. 2A, between the first side platform 236a and clamp sleeve 238 is a first side rib 260a. Additionally, between the second side platform 236b and clamp sleeve 238 is a second side rib 260b. The first and second side ribs 260a, 260b act as structural members supporting the clamp sleeve 238 as well as the first side platform 236a and second side platform 236b. Therein, the first and second side ribs 260a, 260b may prevent degradation to rigid clamp 214 by distributing and redirecting forces, such as those created by dynamic motion, placed on the clamp sleeve 238.

Turning to FIG. 2B, as shown in FIG. 2B, the cable support assembly 144 from FIG. 1 may be shown from a second isometric perspective 261. The second isometric perspective 261 shows the cable support assembly 144 nominally from below with respect to the z-axis. Therein, top and bottom, or upper and lower, in FIG. 2B appear reversed. The second isometric perspective 261 is flipped and mirrored with respect to the x-axis and z-axis compared to the first isometric perspective 200 in FIG. 2A. Therein, the first side 126 and second side 128 in the second isometric perspective 261 may appear flipped or reversed compared to the first isometric perspective 200. Additionally, the front and rear side 122, 124 of the second isometric perspective 261 may appear flipped or reversed compared to the first isometric perspective 200.

As shown in FIG. 2B, the second bore ring 254 may circumferentially encircle and structurally support a second bore orifice 262 of the clamp 214. The second bore orifice 262 and the second bore ring 254 may circumferentially encircle a portion of the grommet 212 and cable 210. A portion of the grommet 212, having a second bore orifice 266 and a second bore ring 264, may extend from the second bore ring 254 of the clamp 214 along the central axis 204. Therein, a portion of the outer surface and other surfaces of the second bore orifice 262 and second bore ring 264 may not be surrounded by the clamp 214 and may be exposed to atmosphere. The second bore orifice 266 and second bore ring 264 of the grommet 212 may circumferentially surround a portion of the cable. Similar to first bore orifice 222 and first bore ring 224, the cable 210 may be fitted to the grommet 212 by threading the cable 210 into the second bore orifice 266 and second bore ring 264.

One example shown in FIG. 2B, cable support assembly 144 may be mounted to the chassis of a vehicle, such as chassis 116 of vehicle 100. For this example, the second bore ring 264 and second bore orifice 266 may extend toward the rear side 124.

For another example, the cable support assembly 144 may be mounted to the first axle of a vehicle, such as first drive axle 110a of vehicle 100. For this example, the second bore ring 264 and second bore orifice 266 may extend toward the front side 122.

As shown in FIG. 2B, the second bore ring 264 may have a plurality of lands 282 and notches 284 circumferentially surrounding the cable 210. The lands 282 may extend from the circumference of the second bore ring 264 toward the central axis 204 and the cable 210. Therein, the lands 282 may act as an anti-pullout feature and prevent cable 210 from sliding out of the grommet 212 longitudinally along the y-axis or central axis 204. The elasticity of the material forming the grommet 212 may allow for the notches 284 to be compressed and the lands 282 to be pressed closer to the cable 210 when the clamp 214 is tightened. When the clamp 214 is not fastened about the grommet 212, the notches 284 may be wide enough and lands 282 far enough from the central axis 204 so the cable 210 may be threaded through the second bore orifice 266. Therein, when the clamp 214 is unfastened from the grommet 212, the cable 210 may be fitted into or removed from with the grommet 212 through the second bore orifice 266.

As shown in FIG. 2B, lower section 234 of the rigid clamp 214 may have a first side lower surface 268a and a second side lower surface 268b. Fastener shanks 220 of the fasteners 216 may extend through and protrude below the first and second side lower surfaces 268a, 268b, wherein below is in the negative direction along the z-axis. A chassis or another component of a vehicle may have apertures with an internal threading complementary to threading of the fastener shank 220. When aligned (e.g., having collinear centerlines or central axes) with the fastener bores (e.g., first and second fastener bores 442a, 442b in FIG. 4B), the fastener shanks 220 of may extend and be threaded into apertures, referred herein as mounting apertures. For one example, the mounting apertures may be located on the surface of the chassis of a vehicle, such as chassis 116 of vehicle 100 in FIG. 1. Therein, for one example the fastener shank 220 may couple to mounting apertures and mount the rigid clamp 214 to the chassis of a vehicle. For another example, mounting apertures may be located on an axle, such as the first drive axle 110a, or a component coupled to the axle. Therein, for this example, the fastener shank 220 may couple to the mounting apertures and mount the rigid clamp 214 to an axle, such as the first drive axle 110a. However, it is to be appreciated that the fasteners 216 and the embodiment of the chassis of a vehicle are non-limiting. Therein, other components and methods, such as separate set of fasteners or rivets, may be used to mount the clamp 214 to the chassis of a vehicle. Additionally, the clamp 214 may be mounted to other mounting surfaces or components within a vehicle, such as the body 114 of the vehicle 100.

At least one fastener 216 may be used tighten the upper and lower sections 232, 234 of the clamp 214 together and affix the cable support assembly to the mounting surface, such as chassis 116 of vehicle 100.

As shown in FIG. 2B, between the first side lower surface 268a and second side lower surface 268b are a plurality of lower cavities 270. The plurality of lower cavities 270 may extend from the first and second side lower surfaces 268a, 268b to the surface of the clamp sleeve 238 or form into the first and second side cutouts 240a, 240b shown in FIG. 2A. When inserted into and/or fastening the clamp 214, a single or a plurality of fasteners 216 may be spaced away from and do not pass through the plurality of lower cavities 270. The lower cavities 270 may reduce the mass and volume of material used to form the lower section 234, therein reducing the weight of the rigid clamp 214.

As shown in FIG. 2A, the perimeters of the lower cavities 270 may be formed by the walls of a transverse support beam 272, a longitudinal support beam 274, a first wall 276a, and a second wall 276b. The transverse support beam 272 and longitudinal support beam 274 may be perpendicular to one another. The transverse support beam 272 may extend from the first side lower surface 268a, across the longitudinal support beam 274, and to the second side lower surface 268b and may be approximately parallel with the x-axis. The longitudinal support beam 274 may extend from first wall 276a, across the transverse support beam 272, and to the second wall 276b and may be approximately parallel to the y-axis and the central axis 204. The transverse support beam 272, a longitudinal support beam 274, a first wall 276a, and a second wall 276b may act as supporting members for the clamp sleeve 238 and the lower section 234. Therein, transverse support beam 272, a longitudinal support beam 274, a first wall 276a, and a second wall 276b may distribute forces applied to and prevent the degradation of the rigid clamp 214.

Turning to FIG. 3, the cable support assembly 144 from FIG. 1 may be shown from a first cross-section 300. The first cross-section 300 may be taken on the longitudinal cross-section plane 206.

Further details of the grommet 212 and clamp 214 may be shown in FIG. 3. The first cross-section 300 shows the grommet have a strain-relief section 306 that may be external to the clamp 214 and a clamp section 308 that may be substantially (e.g., the majority of the clamp) surrounded by the clamp 214. The first cross-section 300 shows the grommet 212 has a tubular cushion 312, a first grommet bore 314, and a second grommet bore 316. The first cross-section 300 shows the clamp 214 has a clamp bore 324.

As shown in FIG. 3 the strain-relief section 306 of the grommet 212 is not surrounded by the clamp 214 when fully assembled and fastened about the clamp section 308. Therein, the strain-relief section 306 has an outer surface that may be exposed to atmosphere when the clamp 214 is assembled over the clamp section 308. The strain-relief section 306 extends beyond the rigid clamp 214 along the central axis 204. The strain-relief section 306 may circumferentially encircle and extend along and toward the free end of the electrical cable 210, e.g., towards the end of the cable 210 that is mounted to a different component than the cable support assembly 144. The strain-relief section 306 comprises the neck 226, first bore orifice 222, and the first bore ring 224 of the grommet 212. The strain-relief section 306 may extend from a first bore orifice 242 and first bore ring 244 of the rigid clamp 214 and end with first bore ring 224 of the grommet 212. The strain-relief section 306 has a gradually reduced outer diameter as the neck 226 extends along the central axis 204 away from the clamp section 308.

For the example shown in FIG. 3, when mounted to a chassis of a vehicle, such as chassis 116 of vehicle 100, the strain-relief section 306 may extend toward the front side 122 of the vehicle 100. For another example, when mounted to a first axle of a vehicle, such as first drive axle 110a of vehicle 100, the strain-relief section 306 may extend toward the rear side 124 of the vehicle 100. For either of these examples, the strain-relief section 306 may mechanically support and reduce strain placed on the cable 210 beyond the clamp 214. Therein, the strain-relief section 306 may prevent degradation to the cable 210 from strain or other external forces. Additionally, the elastic material forming the strain-relief section 306 may allow the cable 210 to flex with the dynamic motion created by the turning of the first drive axle 110a of the vehicle 100 and/or from other forces along the reference axes 202.

The clamp section 308 comprises the regions of the grommet 212 may circumferentially surround and/or enclosed by the clamp 214, and may include a portion of the neck 226. When assembled and fastened over the grommet 212, the clamp 214 may engage the circumferentially surrounded regions of the clamp section 308 in surface-sharing contact. As shown in FIG. 3, one such feature of the clamp section 308 circumferentially surrounded by the clamp sleeve 238 includes a tubular cushion 312. The tubular cushion 312 acts as jacket that may separate the material of the rigid clamp 214 and the cable 210. The elastic material of the tubular cushion 312 may absorb and distribute acute forces applied to the rigid clamp 214, as well as elastically deform and compress under chronic from the rigid clamp 214. Therein, the tubular cushion 312 may protect the cable 210 from degradation due to sudden acute forces transferred through or compressive forces created by the tightening of the rigid clamp 214. The clamp section 308 may also have regions and features of the grommet 212 not circumferentially enclosed by the clamp 214, such as a portion of the second bore ring 264 and second bore orifice 266. As shown by the second bore orifice 266 in FIG. 2B, the clamp section 308 has an approximately circular interior cross-section for receiving and circumferentially surrounding the cable 210 formed by a plurality of lands 282 and notches 284.

The strain-relief section 306 of the grommet 212 may circumferentially surround a first grommet bore 314. A clearance 318 may be located circumferentially between the surface of the first grommet bore 314 and the surface of cable 210. The first bore orifice 222 may form into and be continuous with the first grommet bore 314.

The clamp section 308 of the of the grommet 212 may circumferentially surround a second grommet bore 316. The second bore orifice 266 may form into and be continuous with the second grommet bore 316. A clearance 320 may be located circumferentially between the surface of the second grommet bore 316 and the surface of cable 210. The clearance 320 of the second grommet bore 316 may be of a greater width (e.g., distance along the z-axis in FIG. 3) than the clearance 318 when the clamp 214 is untightened. It is to be appreciated, that the clearances 318 and 320 may not be limited in dimension along the z-axis and may circumferentially encircle the cable 210 with the first and second grommet bore 314, 316, respectively.

As shown in FIG. 3, the clamp section 308 of the grommet 212 may be housed partially within the clamp bore 324 of the clamp 214. The clamp bore 324 may be circumferentially surrounded and formed by the clamp sleeve 238 when the upper and lower sections 232, 234 of the clamp 214 may be fastened together via fasteners 216. The first and second bore orifices 242, 262 of the rigid clamp 214 may also form into and be continuous with clamp bore 324.

As shown in FIG. 3, an inner ring land 332 may be between the first bore orifice 222 and first grommet bore 314 of the grommet 212 with respect to the y-axis. The inner ring land 332 may extend toward central axis 204 from surface of the first bore orifice 222. The inner ring land 332 may circumferentially surround and contact the cable 210. The inner ring land 332 may act as an anti-pullout feature preventing the grommet 212 from sliding along the central axis 204 or y-axis without deliberate force.

Between the first and second grommet bore 314, 316 of the grommet 212 is a bore reduction 334. The bore reduction 334 may be transitory region located between and continuous with the first and second grommet bore 314, 316. Therein, the bore reduction 334 may have a width (e.g., distance along the x-axis and z-axis) that may decrease along y-axis in a positive direction between the clearance 320 and clearance 318. The bore reduction 334 may also allow the clearance 320 to shrink in width (e.g., in circumferential distance along the x-axis and z-axis) as the fasteners 216 of the clamp 214 are tightened.

As shown in FIG. 3, the inner diameter 342 of the first bore ring 244 and inner diameter 346 of the second bore ring 254 are larger than the inner diameter 344 of the clamp bore 324 and clamp sleeve 238. The second bore ring 264 and neck 226 may have material extending radially from the second grommet bore 316 and/or first grommet bore 314 up to or substantially close to the inner diameters 342, 344, and 346 when the clamp 214 is tightened. Therein, regions the clamp section 308 of the grommet 212 circumferentially encircled by the clamp bore 324 and the clamp sleeve 238 may be smaller in diameter than regions, such as the second bore ring 264 and neck 226 of the grommet 212, circumferentially encircled by first and second bore rings 244, 254 of the clamp 214. Therein, the second bore ring 264 and neck 226 may also act as anti-pullout features and may prevent the grommet 212 from sliding along the central axis 204 and y-axis when the fasteners 216 are sufficiently tightened on the clamp 214. The outer radius of the neck 226 may also prevent the grommet 212 from sliding out of the clamp 214 longitudinally along the y-axis or central axis 204.

If the cable 210 is within the grommet 212, the clamp 214 may be assembled over the clamp section 308, therein to mount the cable support assembly 144 to a surface and support the cable 210 and grommet 212. For the present disclosure, to form and secure the rigid clamp 214 over the grommet 212, the upper section 232 and lower section 234 may be assembled over the clamp section 308 of the grommet 212 and fastened together using fasteners 216.

The fasteners 216 may be tightened with a downward rotational force. The threading of the shank 220 and the head of a fastener 216 may apply a compressive force to the upper and lower sections 232, 234 of the clamp 214. Therein, tightening of the fasteners 216 may cause the upper and lower sections 232, 234 of the clamp 214 to be pulled closer together with respect to the z-axis at the fastening point, and tighten the upper section 232 and lower section 234, e.g., the clamp halves, of the clamp 214. Therein, the inner diameters 342, 346 of the first and second bore rings 244, 254, as well as the inner diameter 344 of the clamp bore 324 and clamp sleeve 238, may be reduced. Therein, the width (e.g., distance in the z-direction in FIG. 3) of clearance 320 may be shortened bringing the surface of the second grommet bore 316 closer to the cable 210. Tightening of the fasteners 216 and clamp 214 may secure and reduce movement of the cable 210 within the clamp 214. Tightening of the fasteners and clamp 214 may also have anti-pullout applications and may prevent the cable 210 from sliding along the central axis 204 or y-axis without a deliberate and substantial force.

The fasteners 216 may also be loosened with an upward rotational force. Loosening the fasteners 216 may cause the upper and lower sections 232, 234 of the clamp 214 to be spaced further apart, therein loosening the clamp 214. If the fasteners 216 are loosened past a threshold, the fasteners 216 may be removed and the upper and lower sections 232, 234 of the clamp 214 may be disassembled. Therein, the clamp 214 may be disassembled and removed from the grommet 212 and cable 210.

Turning to FIG. 4A, a cross-section 400 is shown of clamp 214 when isolated taken along longitudinal cross-section plane 206. The clamp 214 shown in FIG. 4A is fully assembled with the upper section 232 and lower section 234 fastened together.

With the cable 210 and grommet 212 removed, FIG. 4A may show additional features of the clamp 214. Such features include a first inner annulus 412, the second inner annulus 414, and the surface 416 of the clamp bore 324.

As shown in FIG. 4A, the first inner annulus 412 is a transitory region and feature of the first bore orifice 242 located between the clamp bore 324 and the inner diameter 346 of the first bore ring 244 with respect to the central axis 204 and y-axis. The first inner annulus 412 is continuous with the first bore orifice 242 and clamp bore 324. The first inner annulus 412 has a diameter 418 that varies with respect to the z-axis and x-axis. The diameter 418 of the first inner annulus 412 starts at a maximum similar in width, (e.g., distance in along the x-axis or z-axis), to the inner diameter 342 of the first bore ring 244. Traveling toward the center of clamp 214 and the fasteners 216 along the central axis 204 and/or in a negative direction of the y-axis, diameter 418 of the first inner annulus decreases with respect to the x-axis and z-axis.

As shown in FIG. 4A, the second inner annulus 414 is a transitory region and feature of the second bore orifice 262 located between the clamp bore 324 and the inner diameter 346 of the second bore ring 254 with respect to the central axis 204 and y-axis. The second inner annulus 414 is continuous with the first bore orifice 242 and clamp bore 324. The second inner annulus 414 has a diameter 420 that varies with respect to the z-axis and x-axis. The diameter 420 of the second inner annulus 414 starts at a maximum similar in width, (e.g., distance in along the x-axis or z-axis), to the inner diameter 346 of the second bore ring 254. Traveling toward the center of clamp 214 and the fasteners 216 along the central axis 204 and/or in a positive direction of the y-axis, diameter 418 of the first inner annulus decreases with respect to the x-axis and z-axis.

The clamp bore 324 of the clamp 214 forms a surface 416 that is smooth and cylindrical. The surface 416 may be continuous with respect to and along the y-axis. The surface 416 may be broken along the z-axis by the coupling region 235. Additionally, as shown in FIG. 4A, the length of the coupling region 235 along the y-axis may be substantially parallel with the central axis 204. The surface 416 of the clamp bore 324 may circumferentially encircle the central axis 204.

Turning to FIG. 4B, a cross-section 430 is shown of clamp 214 when isolated taken along transversal cross-section plane 208. The clamp 214 shown in FIG. 4B is fully assembled with the upper section 232 and lower section 234 fastened together. For the present disclosure, the cross-section 430 is viewed from the rear side 124 on the transversal cross-section plane 208 FIG. 4B. However, in other examples, mirrored features may be shown when viewing cross-section 430 from the front side 122 on the transversal cross-section plane 208 FIG. 4B.

The cross-section 430 of the transversal cross-section plane 208 may show additional features of the clamp 214. Such features include a first bore arch 432, a first fastener bore 442a, and a second fastener bore 442b. The cross-section 430 shows that the clamp sleeve 238 and clamp bore 324 of the clamp 214 has an approximately circular cross-section taken on cross-section plane 208.

As shown in FIG. 4B the first bore arch 432 may mirror the second bore arch in FIG. 2A. The portion of the first bore ring 244 formed by the upper section 232 of the rigid clamp 214 may be supported by a first side first bore rib 246a and a second side first bore rib 246b. The first and second side first bore ribs 246a, 246b may form a second bore arch 258 with the second bore ring 254. The first bore arch 432 may provide structural support for the first bore ring 244.

As shown in FIG. 4B, the first fastener bore 442a may be located near the first side 126 and extend through the first side platform 236a, and the second fastener bore 442b may be located near the second side 128 and extend through the second side platform 236b. For one example the first and second fastener bores 442a, 442b may have a threading. For this example, the surface 444 of the shank 220 of the fastener 216 may have a threading complementing the threading of first and second fastener bores 442a, 442b The first fastener bore 442a may include a first upper section 446a and a first lower section 448a. The first upper section 446a may be located in the upper section 232 of the clamp 214 above the first lower section 448a located in the lower section 234 of the clamp 214. The second fastener bore 442b may include a second upper section 446b and a second lower section 448b. The second upper section 446b may be locate in the upper section 232 of the clamp 214 above the second lower section 448b located in the lower section 234 of the clamp 214. The first upper and first lower sections 446a, 448a of the first fastener bore 442a may be centered about and aligned along z-axis, (e.g., wherein the z-axis or a line parallel with the z-axis may extend along a centerline through the first upper and first lower sections 446a, 448a) to form the first fastener bore 442a. Likewise, second upper and second lower sections 446b, 448b of the second fastener bore 442b may be aligned along the z-axis to form the second fastener bore 442b.

FIGS. 2A-4B are drawn to scale, although other relative dimensions may be used. FIGS. 1-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It is to be understood that the invention may assume various alternative orientations and step sequences, except where expressly specified to the contrary. It is also to be understood that the assemblies, devices, and methods illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

It will be appreciated that the configurations disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims which follow.

The invention claimed is:

1. A cable support assembly comprising:
   an elastic grommet including:
      a clamp section; and
      a strain-relief section;
   a rigid clamp having:
      an upper clamp half; and
      a lower clamp half, the clamp halves being positioned around the clamp section of the elastic grommet; and
   at least one fastener to tighten the clamp halves together and to affix the cable support assembly to a surface;
   wherein the strain-relief section extends axially along the cable beyond the clamp section.

2. The cable support assembly of claim 1 wherein the grommet, only in the clamp section, has an approximately circular interior cross-section for receiving the cable formed by a plurality of lands and notches circumferentially surrounding the cable.

3. The cable support assembly of claim 1 wherein the rigid clamp extends axially only along the clamp section of the elastic grommet.

4. The cable support assembly of claim 3 wherein an outer surface of the elastic grommet at the strain-relief section is exposed to atmosphere.

5. The cable support assembly of claim 4 wherein the outer surface extends from an end of the rigid clamp with gradually reduced outer diameter axially along the cable away from the clamp section.

6. The cable support assembly of claim 1 wherein the lower clamp half includes a plurality of lower cavities.

7. The cable support assembly of claim 6 wherein the fastener is spaced away from the cavities and does not pass through the cavities.

8. The cable support assembly of claim 1 wherein the rigid clamp directly engages the grommet with surface-sharing contact.

9. A system for a vehicle, comprising:
   a battery coupled to a chassis of the vehicle;
   an electric drive system to drive a wheel of the vehicle mounted to an axle of the vehicle;
   a mounting surface on the axle or on a component mounted on the axle; and
   a cable support assembly including an elastic grommet with a clamp section and a strain-relief section, a rigid clamp including an upper clamp half and a lower clamp half, the clamp halves being positioned around the clamp section of the elastic grommet, and at least one fastener to tighten the clamp halves together and to affix the cable support assembly to the mounting surface; and
   a cable coupling the battery to the electric drive system, the cable support assembly supporting the cable.

10. The system of claim 9 wherein the electric drive system includes an inverter and an electric motor powered via the cable.

11. The system of claim 10 wherein an outer surface of the elastic grommet at the strain-relief section is exposed to atmosphere.

12. The system of claim 11 wherein the outer surface extends from an end of the rigid clamp with gradually reduced outer diameter axially along the cable away from the clamp section, wherein the lower clamp half includes a plurality of lower cavities, and wherein the fastener is spaced away from the cavities and does not pass through the cavities.

13. The system of claim 9 wherein the rigid clamp directly engages the grommet with surface-sharing contact.

14. The system of claim 9 wherein there is relative motion during vehicle operation between the axle and the chassis.

15. The system of claim 9 wherein the cable is a high voltage cable.

16. A system for a vehicle, comprising:
   a battery coupled to a chassis of the vehicle;
   an electric drive system to drive a wheel of the vehicle mounted to an axle of the vehicle including an electric motor, transmission, and inverter;
   a mounting surface on the axle or on a component mounted on the axle; and
   a cable support assembly including an elastic grommet with a clamp section and a strain-relief section, a rigid clamp including an upper clamp half and a lower clamp half, the clamp halves being positioned around the clamp section of the elastic grommet, and at least one fastener to tighten the clamp halves together and to affix the cable support assembly to the mounting surface; and
   a high voltage cable coupling the battery to the electric drive system, the cable support assembly supporting the cable.

17. The system of claim 16 wherein an outer surface of the elastic grommet at the strain-relief section is exposed to atmosphere, and wherein the outer surface extends from an end of the rigid clamp with gradually reduced outer diameter axially along the cable away from the clamp section, wherein the lower clamp half includes a plurality of lower cavities, and wherein the fastener is spaced away from the cavities and does not pass through the cavities.

18. The system of claim 17 wherein the rigid clamp directly engages the grommet with surface-sharing contact.

19. The system of claim 17 wherein the grommet, only in the clamp section, has an approximately circular interior cross-section for receiving the cable formed by a plurality of lands and notches circumferentially surrounding the cable.

* * * * *